(12) United States Patent
Walter

(10) Patent No.: US 6,361,456 B1
(45) Date of Patent: Mar. 26, 2002

(54) INFINITELY VARIABLE SPEED TRANSMISSION

(75) Inventor: Bernhard Walter, Oberkirch (DE)

(73) Assignee: Luk Getriebe-Systeme GmbH, Bühl (DE)

(*) Notice: Subject to any disclaimer, the term of this patent is extended or adjusted under 35 U.S.C. 154(b) by 0 days.

(21) Appl. No.: 09/440,364

(22) Filed: Nov. 15, 1999

(30) Foreign Application Priority Data

Nov. 18, 1998 (DE) .......................... 198 53 113

(51) Int. Cl.$^7$ .................. F16H 59/00; F16H 61/00; F16H 63/00
(52) U.S. Cl. .............................. 474/18; 474/28
(58) Field of Search ..................... 477/45, 46, 18, 477/13, 28; 474/18, 28, 70

(56) References Cited

U.S. PATENT DOCUMENTS

| | | | | |
|---|---|---|---|---|
| 4,634,405 A | * | 1/1987 | Quick et al. | 474/13 |
| 5,169,365 A | | 12/1992 | Friedman | 474/18 |
| 5,628,700 A | * | 5/1997 | Yamada et al. | 474/18 |
| 5,667,448 A | | 9/1997 | Friedman | 474/18 |
| 5,676,612 A | * | 10/1997 | Schellekens et al. | 474/18 |
| 5,725,447 A | | 3/1998 | Friedman et al. | 474/18 |
| 5,879,253 A | | 3/1999 | Friedman et al. | 474/18 |
| 5,941,923 A | | 8/1999 | Fischer et al. | 701/53 |
| 6,089,999 A | * | 7/2000 | Imaida et al. | 474/18 |

FOREIGN PATENT DOCUMENTS

DE 198 53 113.3 11/1998

OTHER PUBLICATIONS

Nunny, M. J., Automotive Technology, Butterworth–Heinemann (1998 3rd Edition), pp. 363–364.*

* cited by examiner

Primary Examiner—David A. Bucci
Assistant Examiner—Marcus Charles
(74) Attorney, Agent, or Firm—Alfred J. Mangels

(57) ABSTRACT

An infinitely variable transmission including a torque sensor, wherein torque is transmitted from a rotary input shaft to a rotary output shaft. The transmission includes adjustable sheaves for axial movement on the input and output shafts of the transmission and that are controlled by hydraulic piston and cylinder units. The torque sensor shifts the adjustable sheaves, which are urged towards each other by a force dependent upon the transmitted torque, into frictional engagement with an endless flexible element that drives the output shaft of the transmission. Retaining elements retain the hydraulic piston and cylinder units and adjustable sheaves on the input and output shafts of the transmission in a predetermined axial position when pressure is applied in a first direction during operation of the transmission, and permit the components to be shifted axially in the opposite direction to simplify assembly/disassembly procedures of the transmission and to reduce manufacturing costs.

4 Claims, 3 Drawing Sheets

INFINITELY VARIABLE SPEED TRANSMISSION

CROSS-REFERENCE TO RELATED APPLICATION

This Application claims foreign priority benefits under 35 U.S.C. § 119(a)–(d) to German patent application 198 53 113.3, filed Nov. 18, 1998 by inventor, Bernhard Walter, for an invention entitled, "Getriebe"(Transmission).

BACKGROUND OF THE INVENTION

1. Field of Invention

This invention relates to improvements in power trains of the type wherein the means for transmitting torque from the rotary output element of a primary power source (such as an internal combustion engine) to a rotary driven element (such as the output shaft of an infinitely variable speed transmission) comprises a torque monitoring sensor integrated with such transmission, in which an endless flexible element (such as a belt or chain) is trained over a pair of adjustable pulleys or sheaves. Each pair of sheaves is adjustable by the torque sensor in response to abrupt changes in the transmitted torque to vary the transmission ratio. More particularly, the present invention relates to improvements in the axial positioning and mechanical attachment of the torque sensor, the adjustable sheaves and their corresponding hydraulic piston and cylinder assemblies on the drive shaft and output shaft of such a transmission. Still more particularly, the present invention discloses a one-sided attachment feature including retaining elements for attaching such hydraulic piston and cylinder assemblies and adjustable sheaves to the driven and output shafts of the infinitely variable speed transmission to locate the components in a fixed axial position when pressure is applied in a first direction and to permit axial movement of the components in an opposite direction to provide efficient operation thereof, to simplify assembly/disassenbly procedures, and to reduce manufacturing costs.

2. Description of the Related Art

Infinitely variable transmissions and torque monitoring devices or sensors of the above outlined character are disclosed, for example, in U.S. Pat. Nos. 5,725,447 and 5,879,253. The torque sensors, which are disclosed in these prior patents, are designed to establish a clamping engagement between component parts of a torque transmitting apparatus depending upon the load or depending upon the transmitted torque. As a rule such torque sensors are designed to ensure a frictional engagement between component parts, which are urged against or toward each other by a force depending upon the transmitted loads or upon the transmitted torque, in such a way that the force acting to urge the component parts into frictional engagement with one another at least approximates the force which is necessary for the transmission of torque. The application of an excessive force for urging the component parts against each other results in excessive wear whereas the application of an insufficient force entails a slip and hence again excessive wear between the parts which are maintained in frictional engagement with one another.

A conventional torque monitoring device or sensor includes a valve whose operation depends upon the magnitude of transmitted torque. Those portions of the torque sensor which are located downstream of a plenum chamber are constructed and assembled to comprise the aforementioned valve and the plenum chamber receives pressurized hydraulic fluid from a suitable pump. The valve acts as a flow restrictor or throttle, which seals the path for the flow of fluid from the plenum chamber so that the pressure of fluid in the plenum chamber increases in response to abrupt increases or peaks of transmitted torque. This results in a corresponding rise of fluid pressure in the plenum chamber as well as in the cylinder chamber or chambers of one or more piston and cylinder units. The piston and cylinder units are provided to adjust the infinitely variable transmission including a pair of adjustable tapered discs or sheaves and an endless flexible element, which is trained over and serves to transmit torque between the adjustable sheaves. The flexible element may constitute either a belt or a chain.

An increase in pressure in the cylinder chamber or chambers brings about a corresponding increase of the clamping force between the endless flexible element and the sheave or sheaves of the transmission. In other words, the frictional engagement between the sheave or sheaves on the one hand and the flexible element on the other hand increases in response to an increase of the transmitted torque and/or in response to the development of an abrupt increase of transmitted torque.

In order to adjust the above-described valve, the torque sensor comprises discs that are provided with confronting cam faces or ramps bearing upon rolling elements, which are retained between them with a force generated by the source of pressurized hydraulic fluid. If the transmitted torque develops abrupt increases or peaks, especially peaks in the torque being transmitted from the primary power source, the discs are caused to move axially and away from each other such that an axially movable portion reduces the effective cross-sectional area of the outlet for the flow of hydraulic fluid from the plenum chamber at a rate proportional to the magnitude of the peaks of transmitted torque.

In addition, the discs serve as a means for mechanically transmitting at least a portion of the driving torque to adjust the effective cross-sectional area of the outlet from the plenum chamber as a function of the magnitude of transmitted torque. Thus, the proper frictional clamping force between the adjustable sheaves and the endless flexible element of the infinitely variable transmission is maintained.

An infinitely variable ratio transmission, which can be utilized in conjunction with the improvements of the present invention as described hereinabove is disclosed in U.S. Pat. No. 5,169,365 to Friedmann and is incorporated herein by reference.

The disclosure in U.S. Pat. No. 5,879,253 entitled: "Torque Monitoring Apparatus", filed Nov. 26, 1997 by inventors, Oswald Friedmann and Armin Veil, is hereby incorporated herein by this reference; and the disclosure in U.S. Pat. No. 5,725,447 entitled: "Power Train with Infinitely Variable Ratio Transmission", filed Dec. 14, 1995, by inventors, Oswald Friedmann, Urban Panther, and Ivo Agner, is also hereby incorporated herein by this reference.

SUMMARY OF THE INVENTION

Accordingly, the present invention is an improved infinitely variable speed transmission wherein the means for transmitting torque from the rotary output of a primary power source (such as an internal combustion engine) to a rotary driven element (such as the output shaft of an infinitely variable transmission) comprises a torque sensor integrated with such transmission, in which an endless flexible element (such as a belt or chain) is trained over a pair of adjustable pulleys or sheaves. The adjustable sheaves are adapted for axial movement on the driven and output shafts of the transmission being actuated by hydraulic piston and cylinder assemblies. The torque sensor is designed to axially shift the adjustable sheaves, which are urged towards each other by a force dependent upon the transmitted torque, into frictional engagement with the flexible element, which drives the output shaft of the transmission and transfers that force to the wheels of the vehicle.

The present infinitely variable speed transmission has been developed to simplify the installation of the torque sensor, the adjustable sheaves, and their respective piston and cylinder assemblies as well as to operationally improve such transmissions. This is accomplished by means of a novel, one-sided attachment feature, which is installed on both the driven and output shafts of the present transmission and which engages a mating structure formed on the shaft-mounted piston and cylinder assemblies to support the same in a fixed, non-rotatable position on the shaft.

In a preferred embodiment this novel attachment feature comprises a circular retaining element(s), which is radially disposed in a circumferential groove formed in both the driven and output shafts at a predetermined axial position. A mating projection formed on the shaft-mounted piston and cylinder assemblies engages the retaining element(s) during an assembly procedure of the transmission to secure the components in their functional position.

Advantageously, the retaining element(s) locate the components in a fixed axial position when pressure is applied in a first axial direction during operation of the transmission and permit axial movement in an opposite direction providing more efficient operation and simplifying assembly/disassembly procedures thereby reducing manufacturing costs.

In view of the above it is an object of the present invention to provide an improved infinitely variable speed transmission comprising an integrated torque sensor and having two adjustable sheaves and an endless flexible torque transmitting element trained over the sheaves, which can be utilized with advantage in the power trains of motor vehicles.

Another object of the present invention is to provide a novel, one-sided attachment feature for securing the torque sensor, the adjustable sheaves, and the shaft-mounted piston and cylinder units in a fixed axial position on the driven and output shafts of the transmission when pressure is applied in a first axial direction and to permit axial movement in an opposite direction.

Another object of the present invention is to provide a one-sided attachment feature as stated above wherein such attachment feature comprises a circular retaining element(s), which is radially disposed in a circumferential groove formed in such shafts and which engages a mating structure formed in the shaft-mounted piston and cylinder assemblies to secure the components in their functional position during operation.

Another object of the present invention is to provide a novel, one-sided attachment feature as stated above which simplifies the installation and assembly/disassembly procedures of the transmission and thereby reduces the manufacturing costs thereof.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1:
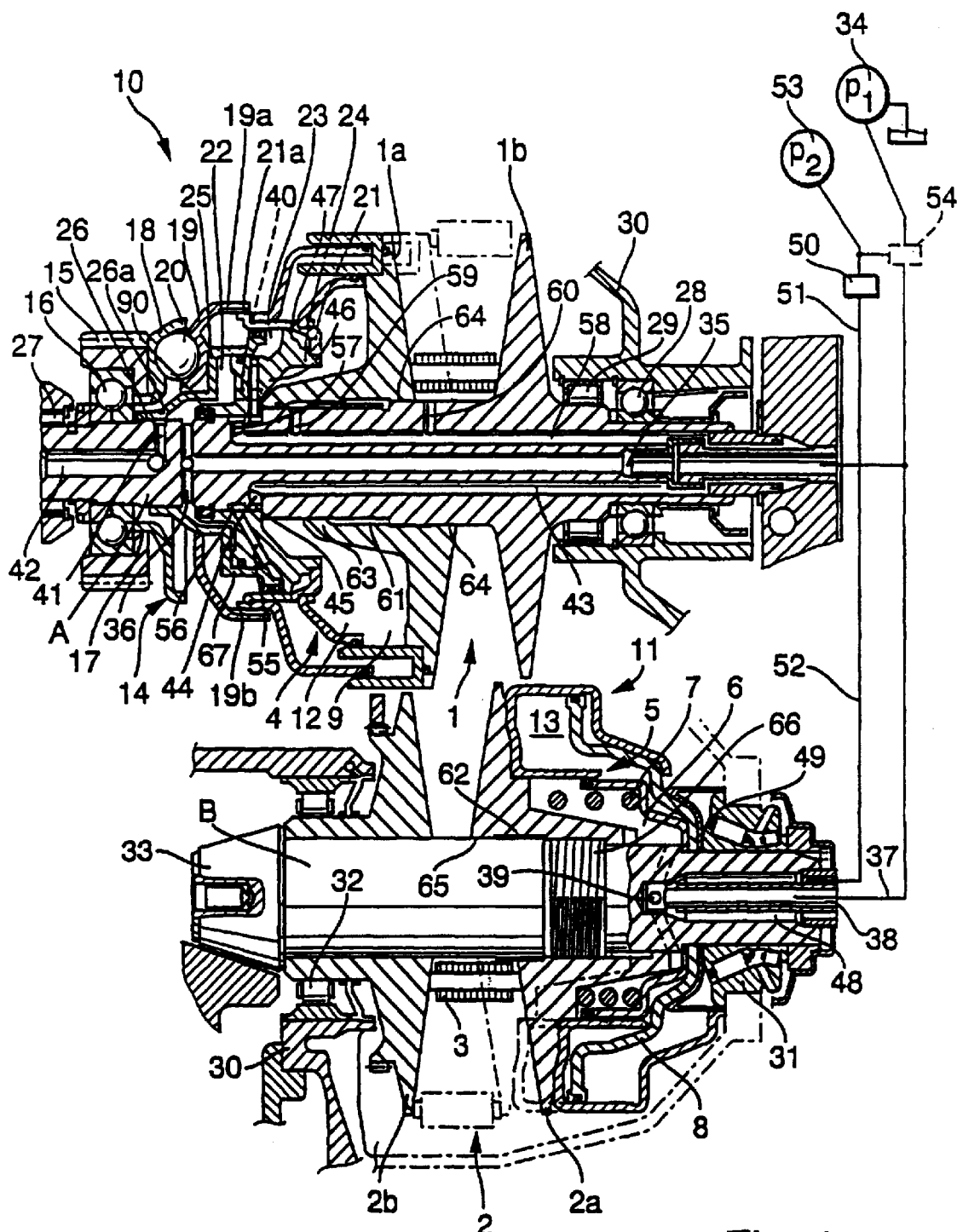
FIG. 1 is an axial section view of an infinitely variable transmission of the PRIOR ART wherein the improvements of the present invention are to be utilized.

Prior to describing the improvements of the present invention in detail, it may be beneficial to review the structure and function of an infinitely variable transmission with which the present invention is to be utilized. For purposes of this application it will be understood that the terminology "variable speed transmission,""infinitely variable transmission," and "infinitely variable speed transmission" are considered to be substantially identical and interchangeable terms. Referring to FIG. 1, there is shown therein an infinitely variable transmission labeled PRIOR ART including a first adjustable sheave, indicated generally at 1, a second adjustable sheave, indicated generally at 2 and an endless flexible element 3, which is trained over and transmits torque between the sheaves 1 and 2. The sheave 1 is non-rotatably carried by a rotary input member depicted herein as a shaft A, which is parallel to a rotary output member comprising a shaft B, which supports and is non-rotatably connected with the sheave 2. The sheaves 1 and 2 are comprised of axially movable first flanges 1a and 2a and axially fixed second flanges 1b, 2b respectively.

The flange 1a is located at a maximum distance from the flange 1b (as shown by solid lines in the upper part of the sheave 1) and the flange 2a is located at a minimum axial distance from the flange 2b (as shown by solid lines in the upper half of the sheave 2 when the ratio of the infinitely variable transmission including the sheaves 1, 2 and the flexible element 3 assumes a minimum value). The transmission then functions in an underdrive mode wherein the revolutions per minute (RPM) of the shaft A can greatly exceed the (RPM) of the shaft B. Alternatively, if the axially movable flange 1 a is caused to move to a position at a minimum axial distance from the axially fixed flange 1b (as shown by solid lines in the lower half of the sheave 1), the flange 2a is located at a maximum axial distance from the flange 2b (as shown in the lower half of the sheave 2) and the transmission functions in an overdrive mode because the RPM of the sheave 2 and shaft B exceeds the RPM of the sheave 1 and shaft A by a maximum value.

The means for adjusting the sheave 1 (i.e. for moving the flange 1a axially and relative to the flange 1b) comprises a hydraulically operated, primary piston and cylinder assembly, indicated generally at 4. Similarly, the means for adjusting the sheave 2 (by moving the flange 2a axially and relative to the flange 2b) comprises a hydraulically operated, primary piston and cylinder assembly, indicated generally at 5. The chamber 6 of the piston and cylinder assembly 5 includes at least one energy storing element depicted herein as a coil spring 7, which biases the axially movable flange 2a in a direction toward the axially fixed flange 2b.

The tension of the coil spring 7 increases in response to movement of the flange 2a axially and away from the flange 2b (i.e. when the flexible element 3 which is trained over the sheave 2 is caused to assume a position at a minimum distance from the common axis of the shaft B and sheave 2. Otherwise stated, the tension of the spring 7 increases in response to a rise in the ratio of the transmission (i.e. to an increase in the RPM of the shaft B relative to the RPM of the shaft A). The coil spring 7 reacts against a cupped member 8 which is rigidly secured to the shaft B, and the spring 7 bears directly upon the axially movable flange 2a of the sheave 2.

The primary piston and cylinder assembly 4 operates in parallel with a secondary piston and cylinder assembly, indicated generally at 10, and the primary piston and cylinder assembly 5 operates in parallel with a secondary piston and cylinder assembly, indicated generally at 11. The purpose of the secondary piston and cylinder assemblies 10, 11 is to vary the ratio of the transmission including the sheaves 1, 2 and the flexible element 3. The secondary assembly 10 defines a cylinder chamber 12, and the secondary assembly 11 defames a cylinder chamber 13. The ratio of the transmission is changed in response to admission of pressurized hydraulic fluid into and in response to evacuation of such fluid from the chambers 12 and 13. To this end, the chambers 12, 13 can be connected to a source of pressurized hydraulic fluid (such as a pump) or with one or more fluid evacuating channels, conduits and/or other suitable passages.

If the ratio of the transmission is to be changed, one of the chambers 12 or 13 receives pressurized fluid to increase its volume whereas the contents of the other of these chambers is evacuated, at least in part, to reduce its volume. The means for regulating the admission of fluid into and the evacuation of fluid from the cylinder chambers 12 and 13 includes one or more suitable valves. Suitable valves for this purpose are well known in the prior art and can be used in the infinitely variable transmission of FIG. 1 to regulate the flow of fluid into and from the cylinder chambers 12 and 13.

The power train which is shown in FIG. 1 further comprises a hydromechanical torque monitoring device or sensor, indicated generally at 14, serving to generate a pressure depending upon the magnitude of transmitted torque. In the embodiment which is shown in FIG. 1, the torque sensor 14 functions to transmit torque from a driver gear or pinion 15 to the first sheave 1 of the infinitely variable transmission. The driver pinion 15 is mounted on an anti-friction bearing 16 which surrounds the input shaft A. The driver pinion 15 transmits torque to a rotary cam disc 18 of the torque sensor 14 by way of a form-locking connection 17, comprised of a set of mating gears.

The cam disc 18 is held in an axially fixed position by the driver pinion 15 and cooperates with an axially movable second cam disc 19 of the torque sensor 14. The cam discs 18, 19 have confronting cam faces in the form of ramps, which abut one or more spherical spreading elements 20 between the discs 18, 19. The cam-disc 19 is free to move axially, but cannot rotate relative to the input shaft A. To this end, the cam disc 19 comprises an integral outer portion 19a, which is radially disposed about the shaft A extending axially and away from the spreading elements 20. This outer portion 19a includes a gear 19b in mesh with a complementary gear 21a on a member 21, which is mounted on and cannot rotate and/or move axially relative to the shaft A. However, the gears 19b and 21a permit axial movements of the cam disc 19 relative to the member 21 and shaft A.

The component parts of the torque sensor 14 define two plenum chambers 22 and 23. Such component parts can be said to constitute or resemble walls including a cone-shaped member 24 and members 25, 26 which are carried by or form part of the cam disc 19. The members 24, 25 and 26 defame the plenum chamber 22. The member 24 is rigidly secured to the shaft A and the illustrated members 25, 26 are shown as separately produced parts (see particularly FIG. 1a) which are non-rotatably affixed to the cam disc 19. The plenum chamber 23 extends radially outwardly beyond and is axially offset relative to the plenum chamber 22. This second plenum chamber 23 is bounded in part by the cone-shaped member 24, by the substantially sleeve-like member 21 which is fixedly connected to the member 24, and by the ring-shaped member 25 which, as already stated above, forms part of or is affixed to the cam disc 19. The latter is movable axially of the shaft A and performs the function of a piston.

Figure 1A:
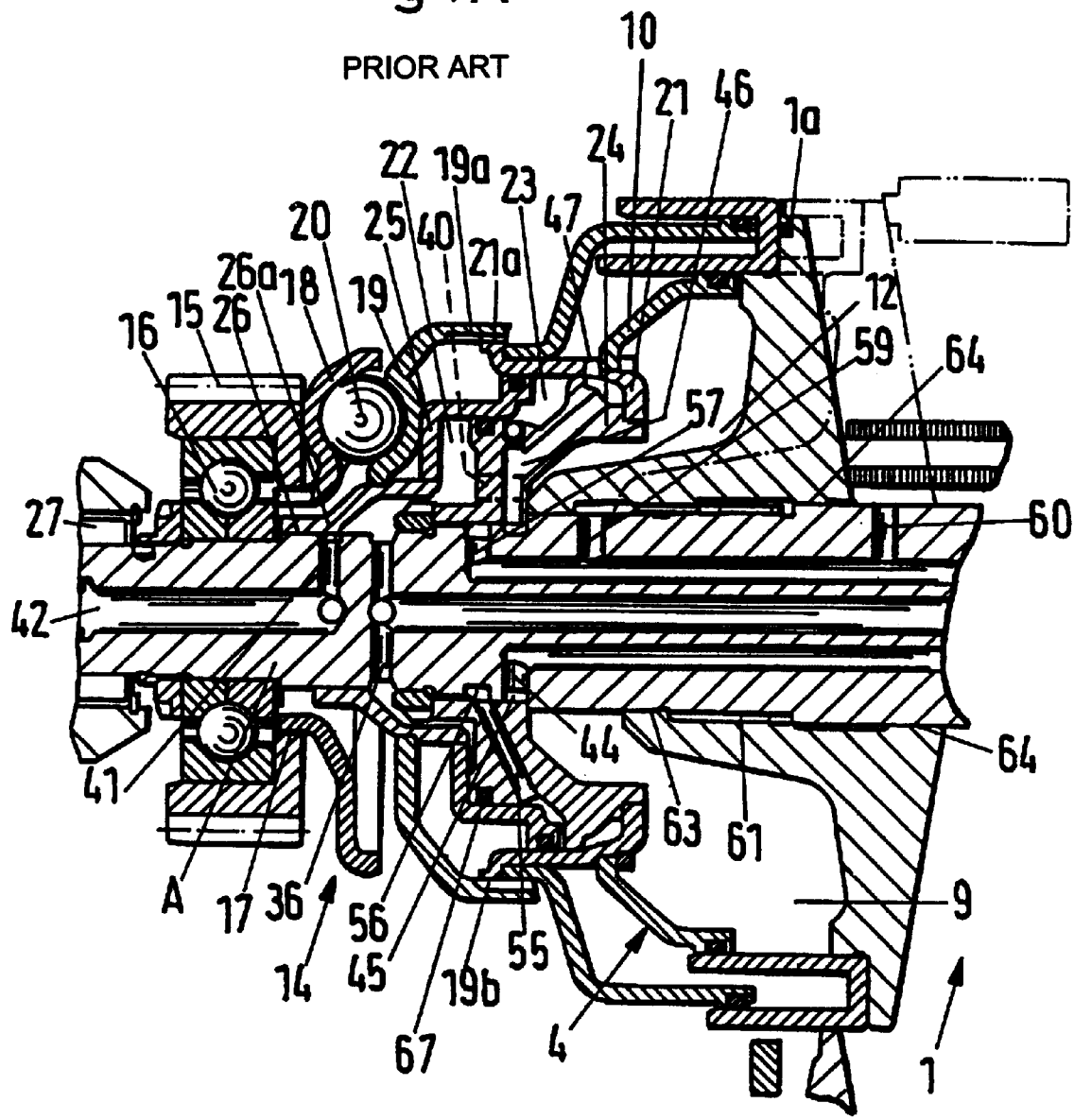
FIG. 1A is an enlarged sectional view of the PRIOR ART transmission of FIG. 1 showing details of the torque sensor and the piston and cylinder assemblies positioned on the driven shaft A.

The input shaft A is mounted in a housing 30 by way of a needle bearing 27, which is disposed at the left-hand side of the torque sensor 14 as viewed in FIGS. 1 and 1A and by way of a thrust roller bearing 28 and a radial roller bearing 29 disposed at the other side of the adjustable sheave 1 as viewed in FIG. 1. The output shaft B is also mounted in the housing 30 by means of a twin anti-friction rolling bearing 31 at the right-hand side of the assemblies 5 and 11 for the axially movable flange 2a of the sheave 2 on the shaft B, and by means of an anti-friction roller bearing 32 to the left of the sheave 2 as shown in FIG. 1. The twin anti-friction bearing 31 is designed to take up radial stresses as well as two-directional axial stresses. The left-hand axial end of the driven shaft B is provided with a bevel gear 33, which can be moved into mesh with a complementary gear in the differential of a power train of a motor vehicle or with a complementary gear which is operatively connected with the differential (not shown).

In order to generate the pressure which is necessary in order to effect appropriate frictional clamping engagement between the flanges of the sheaves 1,2 and the flexible element 3, the torque sensor 14 is operatively connected with a source of pressurized hydraulic fluid such as pump 34. The outlet of the pump 34 is connected with the plenum chamber 22 of the torque sensor 14 by a centrally located, axially extending channel 35 and at least one radially-extending channel 36 both formed in the driving shaft A. The outlet of the pump 34 is further connected with the cylinder chamber 6 of the hydraulic piston and cylinder assembly 5, which acts upon the axially movable flange 2a of the sheave 2. This connection includes a hydraulic fluid line 37, a centrally located axially extending channel 38 in the-driven shaft B, and one or more substantially radially extending channels 39 also formed in the shaft B.

The plenum chamber 22 of the torque sensor 14 is connected with the cylinder chamber 9 of the piston and cylinder assembly 4 for the axially movable flange 1a of the sheave 1 by a channel 40, which is not located in the plane of FIGS. 1 or 1A and is indicated by broken lines in these figures. Channel 40 is formed in the ring-shaped member 24, which is affixed to or integrally formed with the driving shaft A. The channel 40 further establishes permanent fluid communication between the plenum chamber 22 of the torque sensor 14 and the cylinder chamber 9 of the piston and cylinder assembly 4 for the flange 1a of the sheave 1.

The driving shaft A is further provided with at least one channel 41 constituting an outlet for the flow of hydraulic fluid from the plenum chamber 22 of the torque sensor 14. The illustrated channel 41 communicates with or can be caused to communicate with the plenum chamber 22 dependent upon the magnitude of transmitted torque. As shown in FIGS. 1 and 1A, the illustrated channel 41 extends substantially radially and communicates with a second centrally located axially extending channel 42 of the driving shaft A. The channel 42 can also be used as a means for conveying hydraulic fluid from the plenum chamber 22 to one or more component parts forming part of the power train including the torque sensor 14 and the transmission including the sheaves 1, 2 and the flexible element 3. For example, the fluid leaving the plenum chamber 22 via channels 41, 42 can be used as a lubricant and/or as a coolant for the component parts of the transmission including the sheaves 1, 2 and the flexible element 3.

The means for regulating the rate of flow of hydraulic fluid from the plenum chamber 22 by way of the channel or outlet 41 includes an inner portion 26a of the cam disc 19. The components are arranged such that the axial position of the cam disc 19 changes in response to changes in the magnitude of transmitted torque such that a portion 26a of the disc 19 moves axially of the shaft A in covering relation to the channel 41 to throttle the flow of fluid from the plenum chamber 22 dependent upon the magnitude of such torque. It can be said that the portion 26a of the cam disc 19 and that portion of the driving shaft A, which defines the channel or outlet 41, constitute a valve and more particularly a throttle valve or flow restrictor for hydraulic fluid leaving the plenum chamber 22 on its way toward one or more component parts which require lubrication.

Thus, the cam disc 19 functions like a piston which moves axially of the shaft A dependent upon the torque which is being transmitted between the cam discs 18 and 19 causing an increase or a reduction of the rate of fluid flow from the plenum chamber 22 via outlet 41. This results in the establishment, at least in the plenum chamber 22, of a fluid pressure supplied by the pump 34, which is indicative of the magnitude of transmitted torque. Since the plenum chamber 22 is communicatively connected with the cylinder chamber 9 and with the cylinder chamber 6 by means of passages 35 through 39, the fluid pressure in the chambers 6 and 9 is also indicative of the magnitude of transmitted torque.

Since the primary piston and cylinder assemblies 4 and 5 are connected in parallel with the respective secondary piston and cylinder assemblies 10 and 11, the fluid pressure which is supplied for displacement of the axially movable flanges 1a, 2a of the sheaves 1, 2 generates forces which are added to the forces generated as a result of fluid pressure in the cylinder chambers 12 and 13 for the purposes of selecting a desired transmission ratio.

The cylinder chamber 12 of the secondary assembly 10 for the axially movable flange 1a of the sheave 1 receives pressurized hydraulic fluid from a discrete source 53 such as a gear pump or a vane pump by way of an axially parallel channel 43 which is formed in the driving shaft A. At least one substantially radially extending bore 44 which is also formed in the shaft A communicates with the channel 43. A circumferentially extending, peripheral groove 45 formed in the shaft A also communicates with the radially extending bore 44. As shown in FIG. 1, at least one channel 46 is provided in the ring-shaped member 24 and communicates with the groove 45. A substantially radially extending passage 47 formed in the sleeve-like member 21 communicates with the cylinder chamber 12.

The fluid connection between the vane pump 53 and the cylinder chamber 13 of the piston and cylinder assembly 11 for the axially movable flange 2a of the sheave 2 comprises a ring-shaped channel 48 as shown in the lower portion of FIG. 1. Channel 48 is formed in the driven shaft B and surrounds the centrally located channel 38, and at least one substantially radially extending channel 49 also formed in the shaft B connects the channel 48 with the chamber 13. A conduit 51 connects the outlet of the pump 53 with the channel 43, and a conduit 52 connects the outlet of the pump 53 with the channel 48. A valve 50 or a system of valves (not shown) controls the flow of pressurized fluid from the pump 53 via conduits 51, 52 and into the channels 43, 48 of the shafts A and B, respectively.

The pump 53 comprises an optional component part of the power train. If this pump is omitted, the power train comprises a valve 54 shown in FIG. 1 by broken lines or a system of valves (not shown) serving to regulate the flow of pressurized hydraulic fluid from the pump 34 to the conduits 51 and 52. The valve 54 serves to regulate the volumetric flow and/or the pressure of fluid flowing from the pump 34 into the conduits 51 and 52.

The second plenum chamber 23 of the torque sensor 14 is connected in parallel with the first plenum chamber 22, at least when the fluid in the chamber 23 is maintained under pressure. The plenum chamber 23 is sealed off from the pump 34 when the transmission including the sheaves 1, 2 and the flexible element 3 operates in such a way that the rotational speed of the sheave 2 achieves its lowermost (RPM) value because the axially movable flanges 1a and 2a then assume the axial positions, which are shown in the upper portions of the respective sheaves in FIG. 1. This is due to the fact that, at such times, the composite path defined by the channels, bores and/or analogous passages 55 through 60 does not permit hydraulic fluid to flow from the pump 34 to the plenum chamber 23.

In such an instance the axial position of the. flange 1a is positioned in the upper portion of the sheave 1 as shown in FIG. 1, (i.e. the outer end portion of the bore 60 in the driving shaft A is fully exposed) so that the pressure of fluid in the plenum chamber 23 need not exceed atmospheric pressure. The axial force which the torque sensor 14 then transmits for the purposes of torque transmission, and which is being applied to the cam disc 19, is taken up only by the cushion of pressurized hydraulic fluid in the plenum chamber 22. The fluid pressure in the plenum chamber 22 increases if the torque to be transmitted by the torque sensor 14 increases. As described hereinabove, such pressure is regulated by the throttle valve including that portion 26a of the cam disc 19 and that portion of the driving shaft A which defines the channel or outlet 41.

If the ratio of the transmission is to be increased, the flange 1a of the sheave 1 is moved axially along the driving shaft A in a direction toward the axially fixed flange 1b, and the flange 2a of the sheave 2 is moved axially of the driven shaft B and away from the axially fixed flange 2b. This results in movement of the flange 1a toward or all the way to the position shown in the lower half of the sheave 1 and in the movement of the flange 2a toward or all the way to the position shown in the lower half of the sheave 2 as seen in FIG. 1. Axial movements of the flanges 1a and 2a from the positions shown in the upper halves of the sheaves 1, 2 toward the positions shown in the lower halves of the respective sheaves and thereby increasing the ratio of the infinitely variable transmission are initiated by the valve 50 which is actuated to permit pressurized hydraulic fluid to flow from the pump 53 (or from the pump 34 via valve 54 if the pump 53 is omitted) into the cylinder chamber 12 of the piston and cylinder assembly 10. At the same time fluid is free to flow from the cylinder chamber 13 of the piston and cylinder assembly 11. Thus, the volume of fluid in the chamber 12 increases and the volume of fluid in the chamber 13 decreases.

The component features which enable the flanges 1a, 2a to move axially of shafts A and B, but which prevent these flanges from turning relative to the respective shafts A, B include spline couplings 61 and 62.

The axial position of the flange 1a in which the ratio of the infinitely variable transmission assumes a maximum value is shown by solid lines in the lower half and by phantom lines in the upper half of the sheave 1 as shown in FIG. 1. The corresponding position of the upper portion of the flexible element 3 is shown by phantom lines in the upper half of the sheave 1 as viewed in FIG. 1. The flange 2a assumes the axial position which is shown by phantom lines in the lower half and by solid lines in the upper half of the sheave 2 (as viewed in FIG. 1) when the ratio of the transmission is set at a minimum value.

The axially movable flange 1a of the sheave 1 includes axially spaced apart centering portions 63, 64, which cooperate with the adjacent portions of the periphery of the driving shaft A, and the axially movable flange 2a of the sheave 2 comprises axially spaced apart centering portions 65, 66 which cooperate with the adjacent portions of the periphery of the driven shaft B. In this configuration the flanges 1a and 2a are movable axially of the respective shafts A and B without any, or without any appreciable radial play.

The centering portions 63, 64 of the flange 1a cooperate with those portions of the shaft A which define the adjacent outer end portions of the channels or bores 59, 60 to form therewith a pair of valves. The flange 1a constitutes the axially movable valving element of each of these valves. If the flange 1a is caused to move from the solid-line position shown in the upper half of the sheave 1 in an axial direction to the right as most clearly shown in FIG. 1A, flange 1a will gradually block the outer end portion of the bore 60 to progressively throttle the flow of hydraulic fluid through such bore. When the flange 1a reaches an axial position in which its centering portion 64 seals the outer end portion of the bore 60, the other centering portion 63 seals the outer end portion of the bore or channel 59.

If the flange 1a is caused to continue its axial movement toward the axially fixed flange 1b, the centering portion 64 continues to seal the outer end of the bore 60, but the centering portion 63 advances beyond and exposes the outer end of the bore 59. This position establishes a gradually increasing connection for the flow of hydraulic fluid between the cylinder chamber 9 of the piston and cylinder assembly 4 and the channel 58 of the shaft A which, in turn, establishes a path for the flow of hydraulic fluid to the plenum chamber 23 through the passages 55, 56 and 57. At such time, the outer end of the bore 60 is at least substantially sealed by the centering portion 64 while the plenum chambers 22, 23 are free to communicate with the cylinder chamber 9. Consequently, the pressure of hydraulic fluid in the plenum chambers 22, 23 matches the fluid pressure in the cylinder chamber 9 and also in the cylinder chamber 6 which is in fluid communication with the pump 34 by the channel 35, by the conduit 37 and by channel 38. The difference, if any, between the fluid pressures in the plenum chambers 22, 23 and cylinder chamber 9 and the cylinder chamber 6 is attributable to losses due to friction between the fluid and the surfaces surrounding the respective paths.

Owing to the establishment of a transmission-ratio-dependent connection between the plenum chambers 22 and 23, the axially effective surface of the pressurized fluid cushion which develops in the torque sensor 14 is increased because the axially effective surfaces in the two plenum chambers 22, 23 are added to (i.e. superimposed upon each other). Such increase of the overall dimensions of the axially effective supporting surface ensures that, if the magnitude of the torque remains unchanged, the pressure which is being built up by the torque sensor 14 is reduced at least substantially proportionally to the increase of the effective surface. This, in turn, means that the pressure of hydraulic fluid in the cylinder chambers 9 and 6 is reduced accordingly. Thus, the torque sensor 14 can be resorted to for transmission-ratio-dependent modulation of fluid pressure in superimposition upon that pressure modulation which is dependent upon the magnitude of transmitted torque. Otherwise stated, the torque sensor 14 permits or renders possible a two-stage modulation of the pressure or pressure level.

In the power train which is shown in FIGS. 1 and 1A, the mutual positions of the bores 59, 60 as well as their positions relative to the centering portions 63, 64 of the axially movable flange 1a are selected in such a way that the switching over from the establishment of fluid pressure only in the plenum chamber 22 to the establishment of fluid pressure in the plenum chambers 22, 23 or vice versa takes place when the ratio of the continuously variable transmission including the sheaves 1, 2 and the flexible element 3 equals or approximates one-to-one. It is advisable to ensure that the shift from the plenum chamber 22 to the combination of plenum chambers 22, 23 or vice versa take place gradually rather than abruptly for structural or constructional reasons. In other words, it is desirable to establish a transition stage during which the bore 60 is already sealed by the axially movable flange 1a while the bore 59 is still sealed from the cylinder chamber 9 of the piston and cylinder assembly 4.

In order to ensure satisfactory operation of the torque sensor 14 and the continuously variable transmission during such transitional stage, the cam disc 19 of the torque sensor 14 must be mounted with freedom of movement in the axial direction of the driving shaft A and the torque sensor comprises means for facilitating a change of the effective volume of the plenum chamber 23. This enables the torque sensor 14 to function like a pump in that its component parts, which can be said to constitute a piston and a cylinder are movable relative to each other.

In the power train of FIGS. 1 and 1A, the compensating means for facilitating a change of the effective volume of the plenum chamber 23 is a so-called tongue or lip seal 67 which is installed in a circumferentially extending annular recess or groove of the ring-shaped member 24 and contacts the adjacent internal cylindrical surface of component 25. In other words, the lip seal 67 functions to seal the plenum chambers 22, 23 from each other.

The illustrated lip seal 67 is designed and placed in such a way that it functions as a check valve that permits fluid to flow in only one axial direction from the plenum chamber 22 into the plenum chamber 23, but prevents the fluid from flowing in the opposite direction. In other words the lip seal 67 prevents an equalization of pressure between the two chambers 22 and 23 whereas a flow through the seal 67 is possible in the other axial direction.

Thus, when the cam disc 19 is caused to move in a direction to the right, as viewed in FIGS. 1 and 1A, and when the plenum chamber 23 is otherwise sealed, fluid can flow from the plenum chamber 23 into the plenum chamber 22. If the cam disc 19 is thereupon caused to move axially in a direction to the left, again as viewed in FIGS. 1 and 1A, the pressure in the plenum chamber 23 can decrease and in some cases air bubbles can form in the oil. However, this will not adversely affect the mode of operation of the torque sensor 14 or the infinitely variable transmission.

The lip seal 67 can be replaced by, or even be utilized in conjunction with, a check valve or one-way valve of any standard or other suitable design. If a standard check valve is used in the power train of FIGS. 1 and 1A, it can be mounted in or on the ring-shaped member 24. In such instance, the illustrated lip seal 67 is or can be replaced with a seal which is effective at all times (i.e. which permits hydraulic fluid from flowing between the plenum chambers 22, 23 in either direction).

Still further, a check valve performing the function of the lip seal 67 can be installed between the channels 35 and 58. All that is required is that the selected check valve or valves permit pressurized hydraulic fluid to flow from the plenum chamber 23 into the plenum chamber 22 but not in the opposite direction.

From the preceding description of the power train it is clear that when the infinitely variable transmission acts as a step-down transmission (i.e. when the transmission can be said to be operating in an underdrive mode), the axial force which is generated by the cams or ramps of the cam discs 18 and 19 is taken up only by the axially effective surface, which develops in the plenum chamber 22. On the other hand, when the transmission acts as step-up transmission (i.e. when the transmission can be said to be operating in an overdrive mode), the axial force which is furnished by the ramps or cams of the cam discs 18, 19 and acts upon the disc 19 is counteracted by axially effective surfaces in both plenum chambers. Thus, and if the input torque does not change, the pressure generated by the torque sensor 14 when the transmission acts as a step-down transmission is higher than the pressure which is generated by the torque sensor 14 when the transmission acts as a step-up transmission.

As described hereinabove, the infinitely variable transmission of FIGS. 1 and 1A is designed in such a way that the switchover point, which causes a connection or separation between the plenum chambers 22, 23 takes place when the transmission ratio is within a range of approximately one-to-one. However, such switchover point can be readily shifted in either direction (i.e. toward a higher or a lower transmission ratio) by the simple expedient of properly dimensioning and/or positioning the bores 59, 60 of the driving shaft A and/or the centering portions 63, 64 which are provided on the axially movable flange 1a to control the flow of hydraulic fluid through the respective bores. The term switchover point is not intended to define a single accurately defined axial position of the flange 1a, but can also embrace a reasonable range of such axial positions.

The connection or separation between the plenum chambers 22 and 23 can also be affected by a special valve designed for this purpose. To this end, the torque sensor 14 can be provided with a channel, which establishes a path for the flow of hydraulic fluid between the plenum chambers 22, 23 and the special valve can be installed in such conduit. The valve need not be actuated directly by the axially movable flange 1a or 2a, but can receive signals for actuation from an externally located energy source. For example, the valve can constitute a hydraulically or pneumatically actuated or an electromagnetic valve, which is actuated in dependency upon the transmission ratio or upon a change of the transmission ratio of the infinitely variable transmission. Highly satisfactory results can be obtained with a so-called 3/2-way valve, which is installed to permit or to interrupt the flow of hydraulic fluid between the plenum chambers 22 and 23. The 3/2-way valve or another suitable valve could be installed in a conduit connecting the channels 35 and 58 of the driving shaft A. This would render it possible to seal or to dispense with the bores 59 and 60 of the shaft A. The valve would have to be installed and designed in such a way that it permits fluid to flow from the plenum chamber 23 when the plenum chambers 22 and 23 are sealed from each other. All that is necessary is to provide a connection for the flow of fluid from the plenum chamber 23 to the oil sump in response to appropriate setting of the valve (i.e. when the latter seals the plenum chambers 22, 23 from each other.

When using a valve which is controlled externally (i.e. electromagnetically), it is possible to change the setting of such valve in response to changes in one or more additional parameters. For example, the valve can be actuated in response to detection of abrupt changes (peaks) of torque being transmitted by the power train. This eliminates, or at least reduces, the likelihood of slip between the flexible element 3 and the flanges of the sheave 1 and/or 2 within certain ranges of operation (i.e. within certain ranges of the ratio of the continuously variable transmission.

FIGS. 1 and 1A show that the torque sensor 14 is installed between the primary power source and the axially movable flange 1a of the sheave 1. However, the torque sensor 14 can be readily adapted or modified for installation at one or more other locations (i.e. on the driven shaft B). For example, a torque sensor (not shown) similar to or practically identical with the torque sensor 14 of FIGS. 1 and 1A can be installed adjacent to and downstream of the axially movable flange 2a of the sheave 2 on the driven shaft B. Further, the power train can employ a plurality of torque sensors (not shown), for example, a first torque sensor on the driving shaft A ahead of the axially movable flange 1a (as seen in the direction of power flow) and a second torque sensor on the driven shaft B downstream of the axially movable flange 2a.

FIG. 1 shows that the cylinder chamber 6 of the piston and cylinder assembly 5 for the flange 2a is connected with the torque sensor 14. However, it is also possible to connect the torque sensor 14 with the cylinder chamber 13 in the piston and cylinder assembly 11 to ensure that the pressure of hydraulic fluid in the cylinder chamber 13 is determined by the torque sensor. The piston and cylinder assembly 5 including the cylinder chamber 6 then forms part of the means for changing the ratio of the continuously variable transmission. All that is necessary in order to carry out the above-outlined modifications of the transmission is to switch the connections for the conduits 37 and 52.

It is presently preferred to mass-produce several component parts of the torque sensor 14 from a suitable metallic sheet material. This also applies for the cam discs 18 and 19. Such parts can be produced in a suitable stamping or embossing machine.

Figure 2:
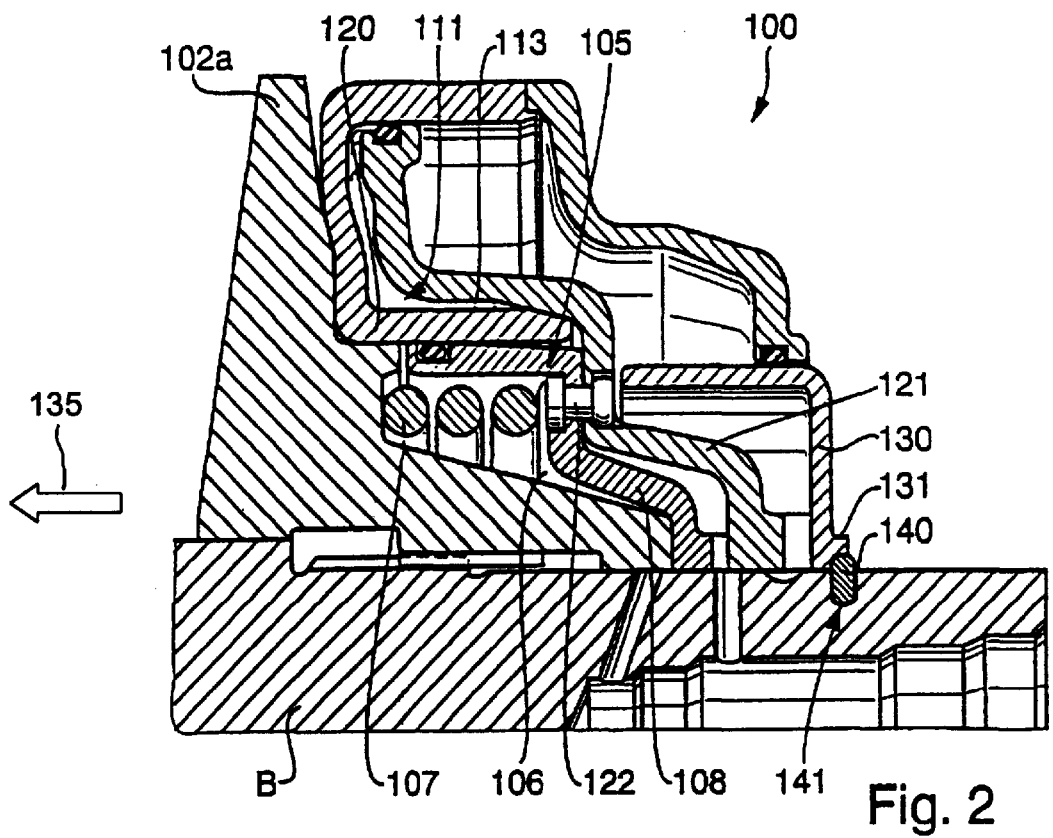
FIG. 2 is a fragmentary axial sectional view of a detail of the improved infinitely variable speed transmission showing the one-sided attachment feature of the present invention securing a piston and cylinder assembly on the output shaft B.

Novel improvements to the infinitely variable transmission in accordance with the present invention will now be described in detail. Referring to FIG. 2, there is shown therein an axial sectional view of a detail of the improved infinitely variable speed transmission of the present invention, indicated generally at 100, which utilizes the one-sided attachment feature of the present invention. A primary piston and cylinder assembly, indicated generally at 105, and a secondary piston and cylinder assembly, indicated at 111, are provided to produce the contact pressure and adjustment of the infinitely variable speed transmission. The aforementioned assemblies 105, 111 define pressure chambers 106 and 113, which can be supplied with hydraulic pressure media such as transmission oil. A movable flange 102a of a sheave is slidably mounted on a shaft B so as to permit axial displacement of the flange whereon an endless flexible element (not shown) is trained. The pressure chamber 106 in FIG. 2 is utilized to provide contact pressure control and the pressure chamber 113 for shift control. Thus, it will be seen that in this detail, the improved infinitely variable speed transmission is substantially similar in function to the PRIOR ART transmission shown in FIG. 1 and described hereinabove.

However, novel structural modifications are provided which simplify the mounting and assembly of the components as hereinafter described. The pressure chamber 106 is bounded by the surface of the flange 102a, a pot-shaped member 108, and the circumferentially extending ring element 120 as shown. The pot-shaped member 108 is fixedly connected to a piston 121 by means of a fastening element such as a rivet 122. The piston 121 is supported by and bears in an axial direction on the cup-shaped element 130. However, such axial support for piston 121 is provided only in the direction away from the flange 102a, but the piston 121 and also the cup-shaped element 130 remain axially displaceable in the opposite direction as indicated by directional arrow 135.

The cup-shaped element 130 is supported against axial movement by means of a first retaining element 140, which is installed within a groove 141 extending circumferentially about the shaft B as shown in FIG. 2. The modified cup-shaped element 130 includes an integrally formed, axially projecting member or collar 131 defining an overhang or, in other words, a counterbore that is dimensioned so as to be radially engaged about the retaining element 140 when installed providing support therefor and retaining it in position.

In the preferred embodiment the projection or collar 131 may be a generally ring-shaped projection or boss integrally formed with and extending circumferentially about an axis of cup-shaped element 130. Alternatively, it may be comprised of a plurality of individual projections (not shown), which are disposed concentrically about an axis of the cup-shaped element 130 for the same purpose (i.e. to engage the retaining element 140).

The first retaining element 140 is a generally circular component fabricated of a suitable material such as steel and may include a plurality of semicircular ring segments (not shown) configured to be retained within the groove 141. In an installation procedure for the retaining element 140, the cup-shaped element 130 is mounted on the shaft B and displaced axially (i.e. to the left as shown in FIG. 2) in the direction of the flange 102a. Thereafter, the retaining element 140, which may be comprised of a plurality of semicircular ring segments, is installed into the groove 141 to form the completed circular element 140 and the cup-shaped element 130 is brought back to its axial position into engagement with the retaining element 140 as seen in FIG. 2.

Thus, in the present invention a one-sided attachment of the piston and cylinder assemblies 105 and 111 to the shaft B is accomplished by use of the modified cup-shaped element 130 with collar 131 and the first retaining element 140, which secure the components in a predetermined axial position and support the axial movement thereof in a direction away from the first retaining element 140. This is advantageous in that during the operation of the transmission, the cup-shaped element 130 can be fixedly engaged by pressure in a predetermined axial position against the retaining element 140 and yet remain axially displaceable in the opposite direction indicated by directional arrow 135 for assembly or maintenance procedures.

Figure 3:
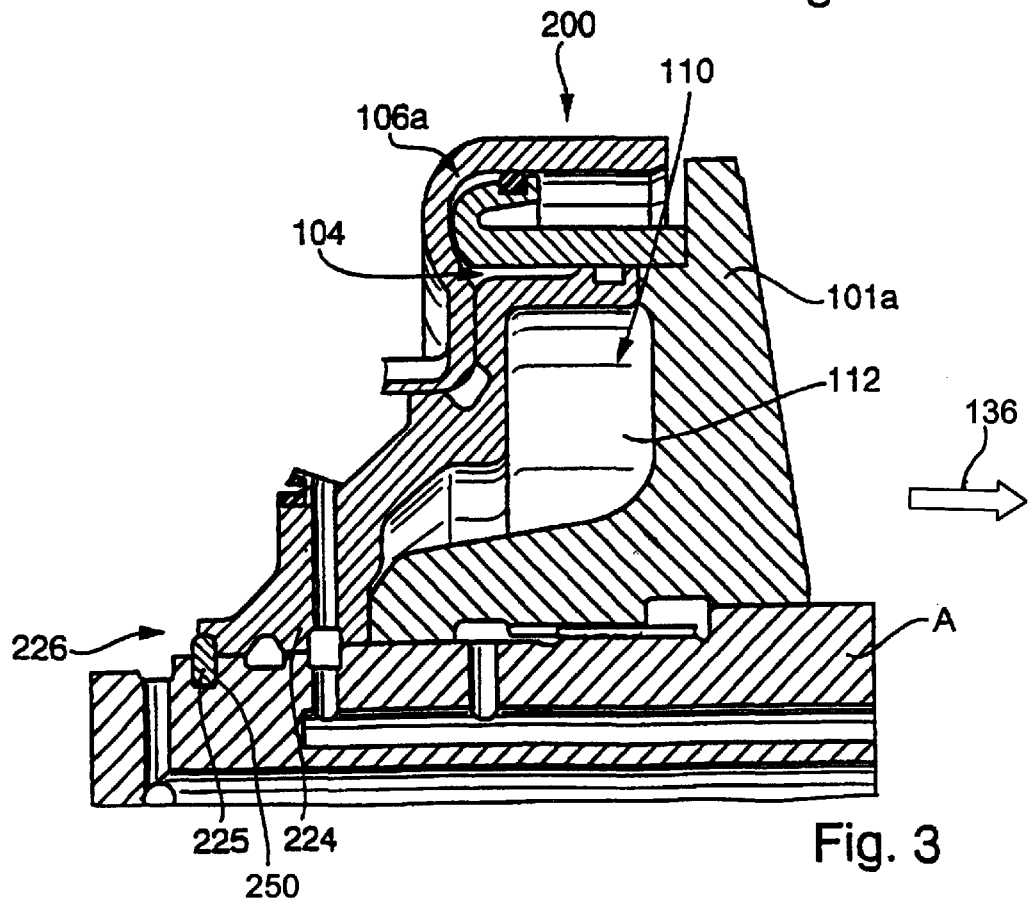
FIG. 3 is a fragmentary axial sectional view of a detail of the improved infinitely variable speed transmission showing the one-sided attachment feature of the present invention securing a piston and cylinder assembly on the driven shaft A.

Referrring now to FIG. 3, there is shown therein a sectional view of a detail of the improved transmission, indicated generally at 200, wherein the torque sensor 14 shown in FIGS. 1 and 1A has been omitted in order to simplify the drawing. The axially displaceable flange 101a is provided with piston and cylinder assemblies, indicated generally at 104 and 110 respectively, corresponding to those described above with regard to the PRIOR ART and illustrated in FIG. 1. The assemblies 104 and 110 define pressure chambers 106a and 112, which can also be supplied with hydraulic pressure media such as transmission oil. The movable flange 101a is slidably mounted on mating spline couplings formed on the flange 101a and on the shaft A as shown in FIG. 3 to permit axial displacement of the flange whereon the endless flexible element (not shown) is trained.

A modified cone-shaped component 224 corresponding generally to member 24 in FIG. 1 is secured in its axial position on the shaft A by means of a second retaining element 225 as seen in FIG. 3. The retaining element 225 is designed to be substantially identical to the retaining element 140 as shown in FIG. 2 and is installed in a groove 250 of the shaft A in a similar manner. In order to engage the retaining element 225 within the groove 250, the cone-shaped component 224 is also provided with an integral collar 226 projecting in an axial direction that defames an overhang or counterbore in a manner substantially identical to collar 131, which engages the retaining element 225 within the groove 250 using the same installation procedure described hereinabove for retaining element 140. Alternatively, the collar 226 may also be comprised of a plurality of individual projections (not shown), which are disposed concentrically about an axis of the cone-shaped element 224 for the same purpose (i.e. to engage the second retaining element 225).

Thus, in the present invention a one-sided attachment of the piston and cylinder assemblies 104 and 110 to the shaft A is accomplished by the use of the modified cone-shaped element 224 and the second retaining element 225, which fixedly engages such assemblies in a predetermined axial position thereby supporting axial movement in a direction away from the second retaining element 225. Yet the assemblies 104 and 110 remaining axially displaceable in the opposite direction indicated by directional arrow 136, which is advantageous in that it provides advantages during assembly/disassembly of the transmission, which reduces manufacturing costs and maintenance costs.

Although not specifically illustrated in the drawings, it should be understood that additional equipment and structural components will be provided as necessary and that all of the components above are arranged and supported in an appropriate fashion to form a complete and operative transmission incorporating features of the present invention.

It is also understood that variations may be made in the present invention without departing from the scope of the invention. Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. A steplessly-adjustable, belt-driven conical pulley transmission having a first pair of conical disks and a second pair of conical disks, wherein one conical disk of each pair is axially displaceable and the other conical disk of each pair is axially fixed, an endless torque-transmitting member for transmitting torque between the pairs of conical disks, and substantially annularly-formed piston-cylinder units and pressure chambers for applying pressure to and for axial displacement of the axially displaceable conical disks, said transmission comprising: at least one retaining element for axially retaining at least one annular element of the piston-cylinder units on one side thereof, whereby a transversly-extending surface of the annular element engages axially in one axial direction against the retaining element and is displaceable in an opposite direction, whereby the retaining element for axially retaining an annular element is provided on a shaft of the transmission and is received in a circumferential groove on the shaft, whereby the retaining element is a multiple-part circular element that is supported in a radially outward direction by a projection carried by the annular element.

2. A transmission in accordance with claim 1, wherein the retaining element is formed from at least two circular segments.

3. A transmission in accordance with claim 1, wherein the annular element has at least one projection extending in the axial direction.

4. A transmission in accordance with claim 1, wherein the projection carried by the annular element is an annular projection.

* * * * *